(12) United States Patent
Lee et al.

(10) Patent No.: US 8,608,181 B2
(45) Date of Patent: Dec. 17, 2013

(54) ACTIVE ROLL CONTROL SYSTEM

(71) Applicant: Hyundai Motor Company, Seoul (KR)

(72) Inventors: Un Koo Lee, Seoul (KR); Sung Bae Jang, Suwon-si (KR); Pil Young Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/711,214

(22) Filed: Dec. 11, 2012

(65) Prior Publication Data

US 2013/0147136 A1 Jun. 13, 2013

(30) Foreign Application Priority Data

Dec. 12, 2011 (KR) .................. 10-2011-0132872

(51) Int. Cl.
*B60G 17/015* (2006.01)
(52) U.S. Cl.
USPC ........................................ 280/5.508
(58) Field of Classification Search
USPC .................. 280/5.508, 5.507, 5.511, 5.52
See application file for complete search history.

(56) References Cited

U.S. PATENT DOCUMENTS

| | | | |
|---|---|---|---|
| 4,892,329 A | 1/1990 | Kozaki et al. | |
| 5,186,486 A | 2/1993 | Hynds et al. | |
| 6,175,792 B1 | 1/2001 | Jones et al. | |
| 6,254,114 B1 | 7/2001 | Pulling et al. | |
| 7,325,820 B2 | 2/2008 | Allen et al. | |
| 7,377,529 B2 | 5/2008 | Green | |
| 7,427,073 B2 | 9/2008 | Won | |
| 7,766,344 B2 | 8/2010 | Buma | |
| 8,302,973 B2 | 11/2012 | Lee et al. | |
| 8,398,092 B2 | 3/2013 | Lee et al. | |
| 8,408,559 B1 | 4/2013 | Lee et al. | |
| 2001/0054801 A1 | 12/2001 | Perello et al. | |
| 2009/0288297 A1 | 11/2009 | Schmidt et al. | |
| 2012/0306177 A1 | 12/2012 | Thill | |
| 2013/0147140 A1* | 6/2013 | Lee et al. | 280/124.106 |
| 2013/0147141 A1* | 6/2013 | Lee et al. | 280/124.106 |
| 2013/0147142 A1* | 6/2013 | Lee et al. | 280/124.106 |

FOREIGN PATENT DOCUMENTS

| | | |
|---|---|---|
| JP | 5-5557 U | 1/1993 |
| JP | 5-213040 A | 8/1993 |
| JP | 10-297312 A | 11/1998 |
| JP | 2001-520602 A | 10/2001 |
| JP | 2002-114064 A | 4/2002 |
| JP | 2007-182229 A | 7/2007 |
| JP | 4095277 B2 | 3/2008 |
| JP | 2010-42798 A | 2/2010 |
| KR | 1998-045430 A | 9/1998 |
| KR | 10-0629799 B1 | 9/2006 |

(Continued)

*Primary Examiner* — Faye M. Fleming
(74) *Attorney, Agent, or Firm* — Morgan, Lewis & Bockius LLP (57) ABSTRACT

An active roll control system may include a sliding unit which includes a housing disposed on a suspension, a slide rail disposed within the housing along vehicle width direction, and a connector movably disposed on the slide rail, wherein the connector may be pivotally connected with a lower end of the stabilizer link, the connector guided along the vehicle width direction according to vehicle driving condition, and a driving unit connected with the connector so as to drive the connector, wherein the connector may be movable at inward of an imaginary line connecting the first connecting point connected with the knuckle and the second connecting point connected with the outward portion of the sub frame.

7 Claims, 6 Drawing Sheets

(56) References Cited

FOREIGN PATENT DOCUMENTS

| KR | 10-0665320 B1 | 1/2007 |
| KR | 10-2007-0104051 A | 10/2007 |
| KR | 1020090061989 A | 6/2009 |
| KR | 10-2009-0098039 A | 9/2009 |
| KR | 10-0980879 B1 | 9/2010 |

\* cited by examiner

ACTIVE ROLL CONTROL SYSTEM

CROSS-REFERENCE TO RELATED APPLICATION

The present application claims priority to Korean Patent Application No. 10-2011-0132872 filed in the Korean Intellectual Property Office on Dec. 12, 2011, the entire contents of which is incorporated herein for all purposes by this reference.

BACKGROUND OF THE INVENTION

1. Field of the Invention

The present invention relates to an active roll control system vehicle for a vehicle. More particularly, the present invention relates to an active roll control system (ARCS) which can actively control roll of a stabilizer bar connected to a pair of upper arms mounted respectively at both sides of a vehicle body through stabilizer links.

2. Description of Related Art

Generally, a suspension system of a vehicle connects an axle to a vehicle body so as to control vibration or impact transmitted from a road to the axle not to be directly transmitted to the vehicle body when driving. Accordingly, the suspension system of a vehicle prevents the vehicle body and freight from being damaged and improves ride comfort.

Such a suspension system includes a chassis spring relieving impact from the road, a shock absorber reducing free vibration of the chassis spring and improving the ride comfort, and a stabilizer bar suppressing roll of a vehicle (it means that a vehicle inclines with reference to a length direction of the vehicle body).

Herein, the stabilizer bar includes a straight portion and both ends.

Both sides of the straight portion are mounted at the vehicle body, and the both ends are mounted at a lower arm or a strut bar that is a suspension arm through the stabilizer link.

Therefore, in a case that left and right wheels move to the same direction (upward direction or downward direction), the stabilizer bar does not work. On the contrary, in a case that the left and right wheels move to the opposite direction (one moves upwardly and the other moves downwardly), the stabilizer bar is twisted and suppresses the roll of the vehicle body by torsional restoring force.

That is, when the vehicle body inclines toward a turning axis by the centrifugal force in a case of turning or heights of the left and right wheels is different from each other by bump or rebound of the vehicle, the stabilizer bar is twisted and stabilizes position of the vehicle body by torsional restoring force.

Since a conventional stabilizer bar, however, has a constant torsional rigidity, it is insufficient to secure turning stability under various driving conditions by means of torsional elastic force of the stabilizer bar only.

Recently, an active roll control system having an actuator including a hydraulic pressure cylinder and connected to an end of the stabilizer bar so as to control roll actively has been developed.

The active roll control system uses the hydraulic pressure cylinder instead of the stabilizer link connecting the lower arm and the end of the stabilizer bar so as to change a connecting length between the end of the stabilizer bar and the lower arm. Therefore, total roll stiffness of a vehicle due to the stabilizer bar is increased.

Figure 1:
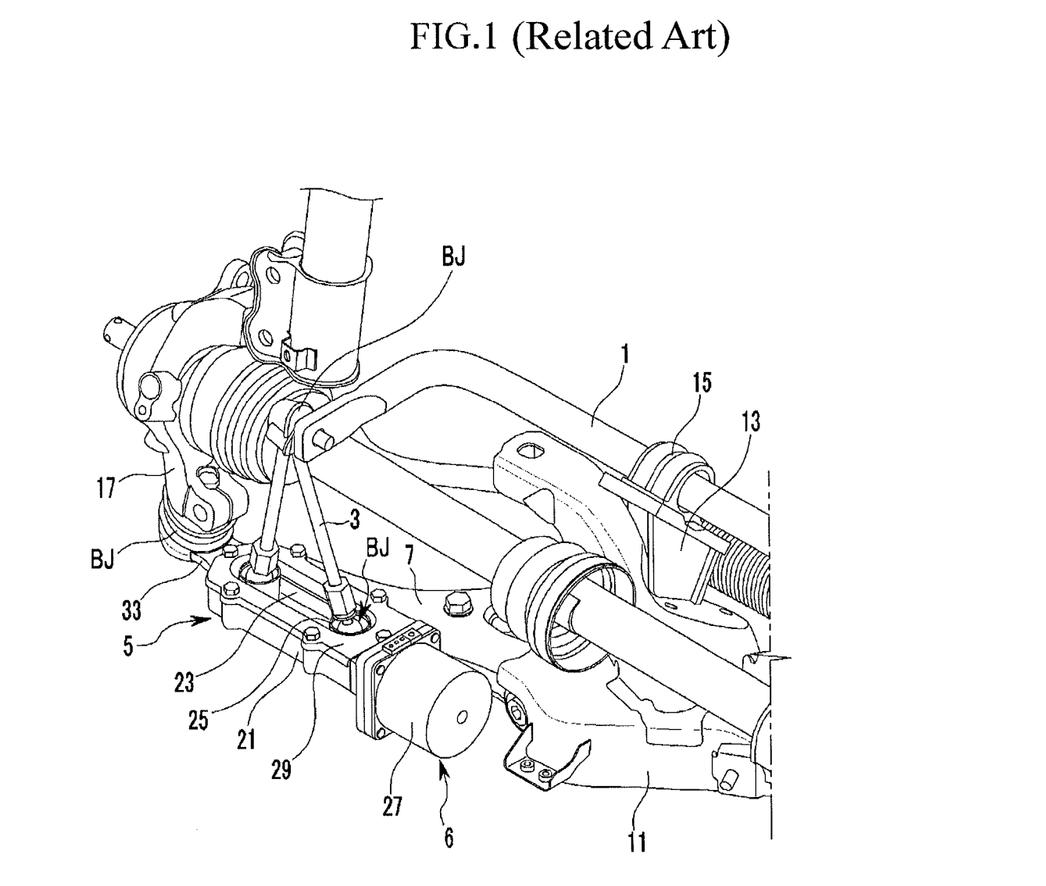
FIG. 1 is a partial perspective view of a conventional suspension system for a vehicle.
Figure 2:
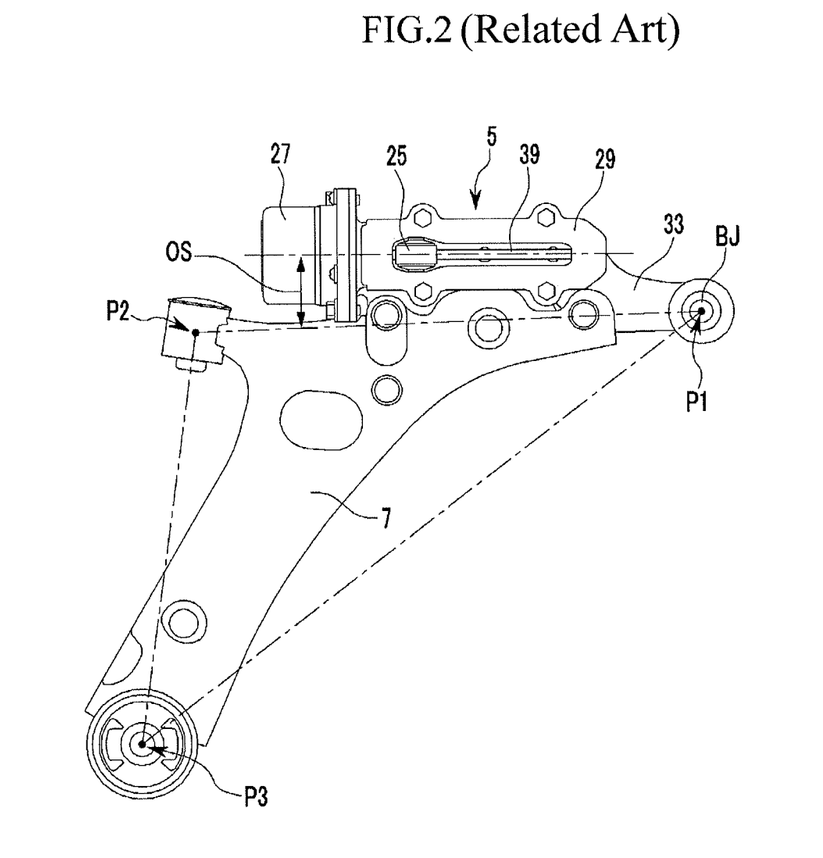
FIG. 2 is a schematic diagram of a suspension system for a vehicle to which an active roll control system for the vehicle according to conventional arts is applied.

FIG. 1 is a partial perspective view of a conventional suspension system for a vehicle, and FIG. 2 is a schematic diagram of a suspension system for a vehicle to which an active roll control system for the vehicle according to conventional arts is applied.

Referring to FIG. 1, an active roll control system according to a conventional art may actively increase total roll stiffness of a vehicle due to the stabilizer bar 1 so as to enhance anti-roll characteristic actively.

Referring to FIG. 1, the active roll control system includes a stabilizer bar 1, a stabilizer link 3, a sliding unit 5 disposed on a lower arm 7 that is a suspension, and a driving unit 6.

Herein, the stabilizer bar 1 includes a straight portion and both ends. And both sides of the straight portion are mounted at a bracket 13 on a sub frame 11 of the vehicle body through a mounting bushing 15.

An upper end of the stabilizer link 3 is connected to an end of the stabilizer bar 1 through a ball joint BJ.

The sliding unit 5 is connected to a side of the lower arm 7 through a housing 21 and rail plates 23 are disposed within the housing 21. A connector 25 connected to a lower end of the stabilizer link 3 is movably disposed to the plate 23. If the driving unit 6 is operated, the connector 25 moves along a vehicle width direction.

The driving unit 6 includes a motor 27 and a lead screw 39 as a rotary shaft of the motor 27.

The housing 21 is opened upward, shaped as a box shape, and connected to the side of the lower arm 7.

A protruded portion 33 is formed to an end of the housing 21 and is connected to a lower portion of a knuckle 17 through a ball joint BJ.

The rail plates 23 are disposed within the housing 21 along vehicle width direction.

The lead screw 39 is disposed along the rail plates 23 through the housing 21.

The connector 25 is disposed between the rail plates 23 within the housing 21 and engaged with the lead screw 39.

The connector 25 is connected with the lower end of the stabilizer link 3 through a ball joint BJ.

The cover 29 to which a slot is formed thereto corresponding to operation distance is connected to the opened upper portion of the housing 21.

The active roll control system may drive the motor 27 according to driving conditions so as to change a connecting position of the stabilizer link 3 on the lower arm 7.

Due to variation of the connecting position of the stabilizer link 3, a total roll stiffness of a vehicle due to the stabilizer bar 1 is increased.

However, referring to FIG. 2, an active roll control system according to a conventional art is offset from a plane connecting points P1, P2 and P3, where connecting portions of the lower arm 7.

In a case of turning or heights of the left and right wheels is different from each other by bump or rebound of the vehicle, compliance effect may occur due to the offset.

The motor 27 of the driving unit 6 operates the stabilizer link 3 away from moving area where the lower arm 7 may move so that the motor 27 is needed to output high power. If the lower arm 7 bumps or rebounds, the lower arm 7 moves the stabilizer link 3 along vehicle width direction during bumping or rebounding, so that high load may be applied to the motor 27.

Particularly, while the point P1 is positioned near a wheel center, however the driving unit 6 is operated away from the point P1, and thus characteristic of lateral force may be deteriorated.

Also, since the motor 27 is positioned where vibration and fly rocks may induce chipping, and thus durability of the motor may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active roll control system (ARCS) which can actively control a mounting position of a stabilizer link on a suspension arm within a suspension arm moving range so as to minimize compliance effect in real operation state.

According to another aspect of the present invention, an active roll control system of which a motor is mounted within a sub frame so as to reduce chipping due to vibration and fly rocks and to enhance durability of the motor.

According to other aspect of the present invention, an active roll control system which may enhance power delivery efficiency of a motor and operation efficiency of stabilizer bar and stabilizer link with simple design of a sliding unit.

In an aspect of the present invention, an active roll control system that is adapted to actively control a roll stiffness of a vehicle by adjusting a mounting position of a stabilizer link connecting a suspension arm with a stabilizer bar of the vehicle on the suspension arm according to a driving condition of the vehicle, may include a sliding unit which may include a housing disposed on a suspension, a slide rail disposed within the housing along vehicle width direction, and a connector movably disposed on the slide rail, wherein the connector is pivotally connected with a lower end of the stabilizer link, the connector guided along the vehicle width direction according to vehicle driving condition, and a driving unit connected with the connector so as to drive the connector, wherein the suspension arm may include connecting points of which a first connecting point connected with a knuckle, a second connecting point connected with an outward portion of a sub frame, and a third connecting point connected with an inward portion of the sub frame, and wherein the connector is movable at inward of an imaginary line connecting the first connecting point connected with the knuckle and the second connecting point connected with the outward portion of the sub frame.

The suspension arm is a lower arm connected with the sub frame and the knuckle of the vehicle.

The housing of the sliding unit is mounted on the lower arm.

The lower arm is connected with the knuckle through a ball joint and is connected with the sub frame through a bushing.

The driving unit may include a drive shaft pivotally connected with the connector, and a motor driving the drive shaft for the connector to be driven.

The drive shaft is disposed on an imaginary line extended from a sliding line of the sliding unit with the push rod near initial operating position thereof.

The stabilizer bar is substantially perpendicular to the stabilizer link when the lower end of the stabilizer link is disposed at a middle stroke on the slide rail.

In an exemplary embodiment of the present invention, an active roll control system (ARCS) can actively control a mounting position of a stabilizer link on a suspension arm within a suspension arm moving range so as to minimize compliance effect in real operation state.

Also, an active roll control system may change a mounting position of the stabilizer bar so that a total roll stiffness of a vehicle may enhanced and thus turning stability of a vehicle may be enhanced.

Also, a motor of an active roll control system is mounted within a sub frame so as to reduce chipping due to vibration and fly rocks and to enhance durability of the motor.

And an active roll control system may enhance power delivery efficiency of a motor and operation efficiency of stabilizer bar and stabilizer link considering movement of a suspension arm.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Description of components that are not necessary for explaining the present invention clearly will be omitted.

In addition, size and thickness of components shown in the drawings may be differ from real size and real thickness of the components for better comprehension and ease of description. Therefore, the present invention is not limited to those shown in the drawings.

Figure 3:
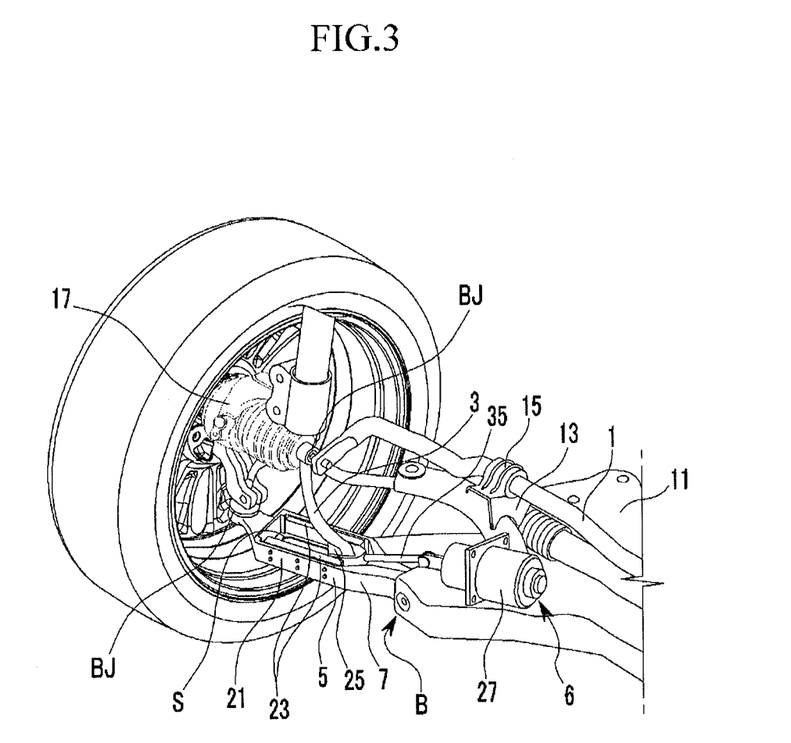
FIG. 3 is a partial perspective view of a suspension system for a vehicle to which an active roll control system for the vehicle according to an exemplary embodiment of the present invention is applied.

For convenience of explaining an exemplary embodiment of the present invention, the left side will be called an outboard side and the right side will be called an inboard side in FIG. 3.

Figure 4:
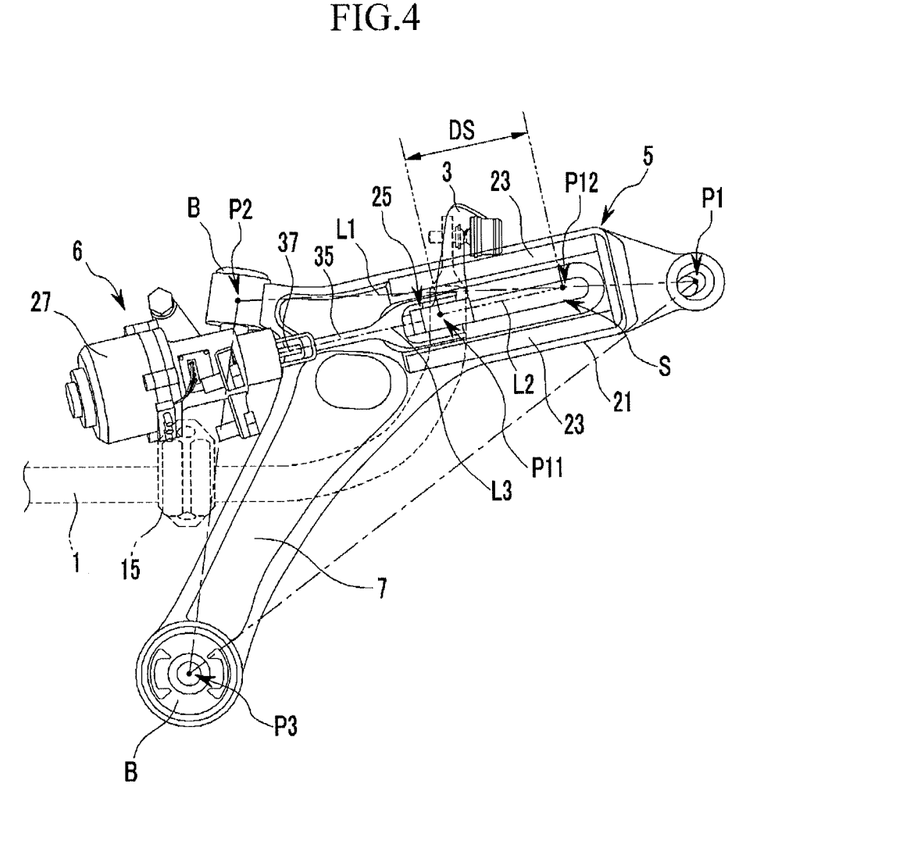
FIG. 4 is a top plan view of a suspension system for a vehicle to which an active roll control system for the vehicle according to an exemplary embodiment of the present invention is applied.
Figure 5:
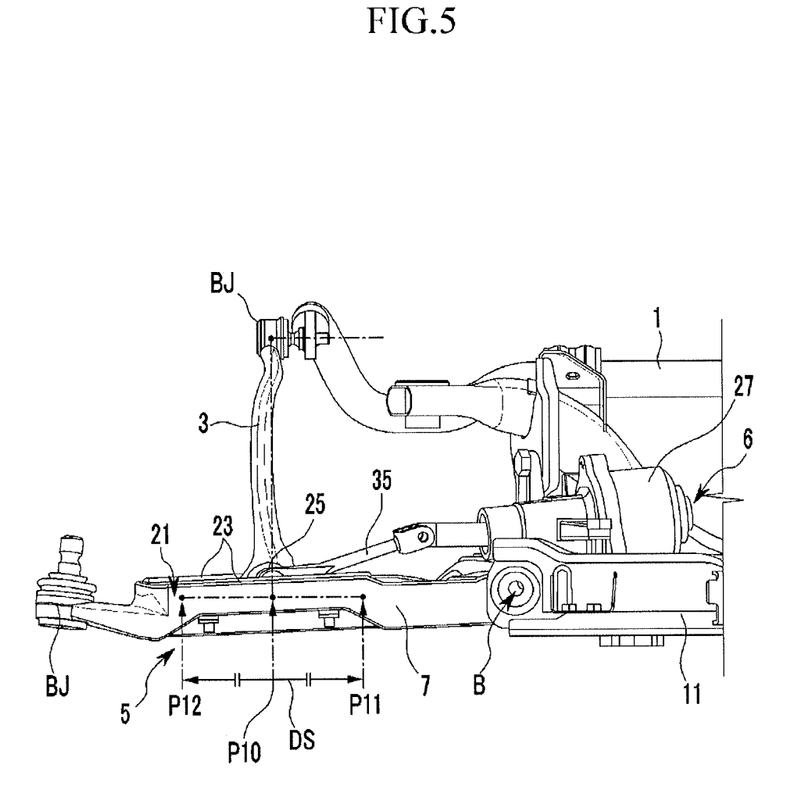
FIG. 5 is a side view of a suspension system for a vehicle to which an active roll control system for the vehicle according to an exemplary embodiment of the present invention is applied.

FIG. 3 is a partial perspective view of a suspension system for a vehicle to which an active roll control system for the vehicle according to an exemplary embodiment of the present invention is applied, FIG. 4 is a top plan view of a suspension system for a vehicle to which an active roll control system for the vehicle according to an exemplary embodiment of the present invention is applied, and FIG. 5 is a side view of a suspension system for a vehicle to which an active roll control system for the vehicle according to an exemplary embodiment of the present invention is applied.

Referring to FIG. 3 and FIG. 4, an active roll control system according to an exemplary embodiment of the present invention includes a stabilizer bar 1, a stabilizer link 3, a sliding unit 5 disposed on a suspension arm and a driving unit 6.

In an exemplary embodiment of the present invention, a lower arm 7 connected with a sub frame 11 and a knuckle 17 of a vehicle will be described as the suspension arm for example.

The lower arm 7 is connected to the knuckle 17 through a ball joint BJ and connected to the sub frame 11 through a bushing B.

Herein, the stabilizer bar 1 includes a straight portion and both ends.

Both sides of the straight portion of the stabilizer bar 1 are mounted at a bracket 13 on the sub frame 11 through a mounting bushing 15.

An upper end of the stabilizer link 3 is connected to an end of the stabilizer bar 1 though a ball joint BJ respectively.

The sliding unit 5 includes a housing 21, a slide rail 23 and a connector 25.

The housing 21 is opened upward in the middle proportion and disposed on the lower arm 7.

The suspension arm, referring to FIG. 4, includes connecting points of which a connecting point P1 connected with a knuckle of the suspension arm, a connecting point P2 connected with an outward portion of a sub frame 11 and a connecting point P3 connected with an inward portion of the sub frame 11. A sliding line L2 is disposed within an imaginary line L1 connecting the connecting point P1 connected with the knuckle 17 and the connecting point P2 connected with the outward portion of the sub frame 11.

The slide rail 23 is disposed within the housing 21 along vehicle width direction as a pair, and a space S is formed there between.

The connector 25 is disposed movably between the slide rails 23.

The connector 25 is connected with the lower end of the stabilizer link 3 and an end of a push rod 35.

The driving unit 6 including a motor 27 is disposed on the sub frame 11.

The driving unit 6 includes a drive shaft 37 movable forward and rearward, and the drive shaft 37 is hingedly connected to the push rod 35 and drives the connector 25 forward and reward through the push rod 35.

Referring to FIG. 4, the drive shaft 37 is disposed on an imaginary line L3 extended from the sliding line L2 of the sliding unit with the push rod 35 near initial operating position thereof on a plane.

And referring to FIG. 5, the stabilizer bar 1 is substantially perpendicular to stabilizer link 3 if the lower end of the stabilizer link 3 is disposed at a middle stroke P10 on the slide rail 23.

The active roll control system drives the motor 27 to as to change the mounting position of the stabilizer link 3 on the lower arm 7 according to a driving condition.

When the mounting position of the stabilizer link 3 is changed, a total roll stiffness of the vehicle due to the stabilizer bar 1 is increased.

The operation of the active roll control system will be described referring to FIG. 7.

Figure 6:
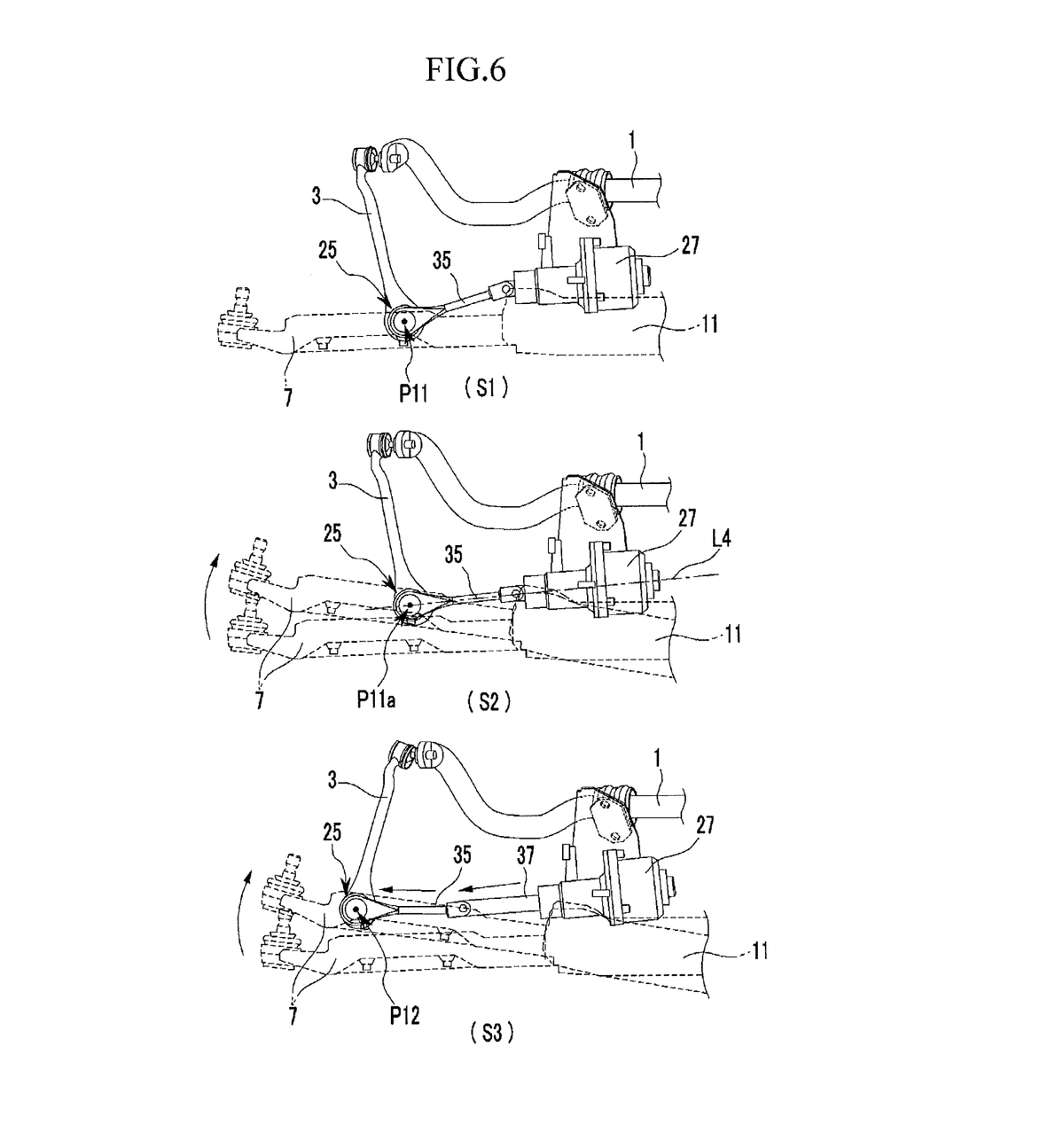
FIG. 6 is a schematic diagram for showing an operation of an active roll control system according to an exemplary embodiment of the present invention.

In a case that the vehicle runs straight, the connector 25 determining the mounting position of the stabilizer link 3 on the lower arm 7 is positioned at an initial position P11 as shown S1 of FIG. 6.

If the vehicle turns at this state, a controller controls the drive motor 27 to rotate in one direction based on signals output from an acceleration sensor, a height sensor, and a steering sensor.

And then, as shown S2 of FIG. 6, the drive shaft 37 of the motor 27 and the push rod 35 are disposed on an imaginary line L4 from a side view at a position P11a near the initial operating position P11 of the drive shaft 37 so that maximum driving torque of the motor 27 is transferred to the connector 25 through the push rod 35.

That is, movement angle of the lower arm 7 due to bump of a vehicle body may induce the drive shaft 37 and the push rod 35 disposed on the line L4 and thus power delivery efficiency of the motor 27 may be enhanced.

In this case, the initial position P11 and the near position P11a may be identical.

As described above, since power delivery efficiency of the motor 27 is enhanced, and thus it is not required to increase capacity of the motor 27.

Meanwhile, the motor 27 is driven completely, as shown in S3 of FIG. 6, the connector determining the mounting position of stabilizer link 3 on the lower arm 7 is positioned at P12, and thus a total roll stiffness of a vehicle due to the stabilizer bar 1 is enhanced. That is, since resistance characteristic against the roll is increased and thus turning stability of the vehicle may be enhanced.

As described above, in an exemplary embodiment of the present invention, the active roll control system may actively adjust the mounting position of the stabilizer link 3 on the lower arm 7 by driving the drive motor 27 according to the driving condition of a vehicle, and thus the roll stiffness of a vehicle may be enhanced.

When the vehicle turns, the mounting position of the stabilizer link 3 on the lower arm 7 is changed, and thus the more resistance characteristic against the roll may suppress the roll of the vehicle body actively.

Also, in an exemplary embodiment of the present invention, on the plane connecting the connecting points P1, P2 and P3 of the lower arm 7, the sliding unit 5 is not offset OS.

In bump-rebound of a vehicle, the plane moves up and down. However, the sliding line L2 of the sliding unit 5 is disposed within the plane and thus the compliance effect may be minimized. That is, the sliding unit 5 drives the stabilizer link 3 within the movement range of the lower arm 7, which is the suspension arm, and thus driving torque of the motor 27 is delivered efficiently.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active roll control system that is adapted to actively control a roll stiffness of a vehicle by adjusting a mounting position of a stabilizer link connecting a suspension arm with a stabilizer bar of the vehicle on the suspension arm according to a driving condition of the vehicle, the active roll control system comprising:
    a sliding unit which includes a housing disposed on a suspension, a slide rail disposed within the housing along vehicle width direction, and a connector movably disposed on the slide rail, wherein the connector is pivotally connected with a lower end of the stabilizer link, the connector guided along the vehicle width direction according to vehicle driving condition; and
    a driving unit connected with the connector so as to drive the connector,
    wherein the suspension arm includes connecting points of which a first connecting point connected with a knuckle, a second connecting point connected with an outward portion of a sub frame, and a third connecting point connected with an inward portion of the sub frame, and
    wherein the connector is movable at inward of an imaginary line connecting the first connecting point connected with the knuckle and the second connecting point connected with the outward portion of the sub frame.

2. The active roll control system of claim 1, wherein the suspension arm is a lower arm connected with the sub frame and the knuckle of the vehicle.

3. The active roll control system of claim 2, wherein the housing of the sliding unit is mounted on the lower arm.

4. The active roll control system of claim 2, wherein the lower arm is connected with the knuckle through a ball joint and is connected with the sub frame through a bushing.

5. The active roll control system of claim 1, wherein the driving unit includes:
    a drive shaft pivotally connected with the connector; and
    a motor driving the drive shaft for the connector to be driven.

6. The active roll control system of claim 5, wherein the drive shaft is disposed on an imaginary line extended from a sliding line of the sliding unit with the push rod near initial operating position thereof.

7. The active roll control system of claim 6, wherein the stabilizer bar is substantially perpendicular to the stabilizer link when the lower end of the stabilizer link is disposed at a middle stroke on the slide rail.

* * * * *